United States Patent
Lee

(10) Patent No.: US 7,830,277 B2
(45) Date of Patent: Nov. 9, 2010

(54) METHOD AND APPARATUS FOR PROVIDING INTRINSIC INFORMATION IN MOBILE COMMUNICATION TERMINAL

(75) Inventor: Moon Heui Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 820 days.

(21) Appl. No.: 11/643,874

(22) Filed: Dec. 22, 2006

(65) Prior Publication Data

US 2008/0068138 A1    Mar. 20, 2008

(30) Foreign Application Priority Data

Aug. 24, 2006    (KR)    ........... 10-2006-0080355

(51) Int. Cl.
*H04B 14/00*    (2006.01)
(52) U.S. Cl. .................. 340/999; 455/411
(58) Field of Classification Search ............. 340/572.1, 340/999; 713/167; 455/411; D14/138 A–138 G
See application file for complete search history.

(56) References Cited

U.S. PATENT DOCUMENTS

| D480,058 S | * | 9/2003 | Chin | ............ D14/138 AB |
|---|---|---|---|---|
| D534,514 S | * | 1/2007 | Hering | ............ D14/138 AA |
| 2002/0073314 A1 | * | 6/2002 | Bhat | ............ 713/167 |
| 2005/0153685 A1 | * | 7/2005 | Choi | ............ 455/411 |

FOREIGN PATENT DOCUMENTS

| CN | 1758785 A | 4/2009 |
|---|---|---|
| KR | 1020020079824 | 10/2002 |
| KR | 1020050073019 | 7/2005 |
| KR | 1020050081178 | 8/2005 |
| KR | 1020060005676 | 1/2006 |

* cited by examiner

*Primary Examiner*—Jeffery Hofsass
(74) *Attorney, Agent, or Firm*—Roylance, Abrams, Berdo & Goodman, L.L.P.

(57) ABSTRACT

A method and apparatus for providing and displaying information generated with a bar code and stored within a mobile communication terminal for easy recognition is provided. The method of providing intrinsic information in a mobile communication terminal includes verifying whether intrinsic information about the mobile communication terminal is stored; and displaying the intrinsic information on a screen when the intrinsic information is stored. Therefore, when a user wants to verify information for a mobile communication terminal, information about the terminal is displayed on a screen with a bar code, so that it is easy to verify and recognize the information about the terminal. Further, even if the mobile communication terminal is turned off, information about the terminal stored in the RFID tag is read by an RFID reader, so that it is easy to verify and recognize the information about the terminal.

17 Claims, 9 Drawing Sheets

METHOD AND APPARATUS FOR PROVIDING INTRINSIC INFORMATION IN MOBILE COMMUNICATION TERMINAL

CROSS-REFERENCE TO RELATED PATENT APPLICATION

This application claims the benefit under 35 U.S.C. §119(a) of Korean Patent Application filed in the Korean Intellectual Property Office on Aug. 24, 2006 and assigned Serial No. 2006-80355, the entire disclosure of which is hereby incorporated by reference.

BACKGROUND OF THE INVENTION

1. Field of the Invention

The present invention relates to a method and apparatus for providing information in a mobile communication terminal. More particularly, the present invention relates to a method and apparatus that can display information generated with a bar code and stored within a mobile communication terminal for easy recognition.

2. Description of the Related Art

Intrinsic information including specification and reference information on a terminal, information about a hardware operation, information required for call processing, and a user's personal information is typically stored in a mobile communication terminal. The information is used when a user uses a mobile communication service. A mobile identification number (MIN) for identifying a user, parameter information required for call processing, information required for a roaming service, and a value related to authentication, among others are also stored.

The specification regarding a terminal includes an electronic serial number, terminal version information, and an electric power reference for use, among others. The information regarding a hardware operation includes information used for radio connection using CDMA channel information and sound level information for use in a terminal, among others.

The intrinsic information uses software for its storage in a terminal, for example, in electrically erasable and programmable read-only memory (EEPROM) of a memory in the terminal. The EEPROM is a nonvolatile storage that stably stores information for a long term without a power source and stores or erases information by electrically changing an electric charge of an element of a chip.

However, the intrinsic information is verified or identified by a terminal developer or a person who upgrades or repairs a terminal.

In a general mobile communication terminal, basic terminal information, for example, a model name of a terminal, production date, and serial number, among others is displayed on a terminal body and a user can easily verify the information.

However, a terminal in which a display unit and a key input unit are formed in both a front surface and a rear surface of the terminal does not have a portion to attach the intrinsic information thereof. This makes it difficult for a user to verify or identify the terminal information.

Accordingly, there is a need for an improved system and method for allowing a user to easily verify intrinsic information for a mobile communication terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus by which a user can easily verify intrinsic information for a mobile communication terminal.

Another object of an exemplary embodiment of the present invention is to provide a method and apparatus that can display information generated with a bar code and stored within a mobile communication terminal for easy recognition.

Another object of an exemplary embodiment of the present invention is to provide a method and apparatus that can easily verify intrinsic information about a mobile communication terminal even when the mobile communication terminal is turned off.

In accordance with an aspect of an exemplary embodiment of the present invention, the above and other objects are accomplished by a method of providing intrinsic information in a mobile communication terminal. A verification is made as to whether intrinsic information regarding the mobile communication terminal is stored. If intrinsic information is stored, the intrinsic information is displayed on a screen.

In accordance with another aspect of an exemplary embodiment of the present invention, the above and other objects are accomplished by a method of providing intrinsic information in a mobile communication terminal. A verification is made as to whether intrinsic information is stored. If intrinsic information is not stored, the intrinsic information is requested. If intrinsic information is stored, the intrinsic information is displayed on a screen.

In accordance with another aspect of an exemplary embodiment of the present invention, the above and other objects are accomplished by a method of providing intrinsic information in a mobile communication terminal. A verification is made as to whether an RFID tag is provided in which intrinsic information of the mobile communication terminal is stored and the RFID tag in which the intrinsic information is stored is read with an RFID reader.

In accordance with another aspect of an exemplary embodiment of the present invention, the above and other objects are accomplished by an apparatus that provides intrinsic information in a mobile communication terminal. The apparatus comprises a receiver, a verification unit and a display unit. The receiver receives intrinsic information of the mobile communication terminal, the verification unit verifies the received intrinsic information and the display unit displays the verified intrinsic information on a screen.

In accordance with another aspect of an exemplary embodiment of the present invention, the above and other objects are accomplished by an apparatus that provides intrinsic information in a mobile communication terminal. The apparatus comprises an intrinsic information providing server, a receiver, a memory, a controller and a display unit. The intrinsic information providing server provides intrinsic information. The receiver receives the provided intrinsic information. The memory stores the received intrinsic information. The controller generates the stored intrinsic information with a bar code and the display unit displays the intrinsic information on a screen.

In accordance with another aspect of an exemplary embodiment of the present invention, the above and other objects are accomplished by an apparatus that provides intrinsic information in a mobile communication terminal. This apparatus comprises a mobile communication terminal and an RFID reader. The mobile communication terminal includes an RFID tag in which intrinsic information is stored and an RFID reader which reads the intrinsic information stored in the RFID tag.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to exemplary embodiments of the present invention, the term "intrinsic information" means all information, for example, a production date, model name, serial number, Bluetooth authentication number, and electronic serial number (ESN), among others, related to a terminal stored within a memory of a mobile communication terminal. The term "intrinsic information providing server" means a server in which the intrinsic information is stored, and when a mobile communication terminal requires its own intrinsic information, the mobile communication terminal can download the intrinsic information by requesting the information to the intrinsic information providing server.

Figure 1:
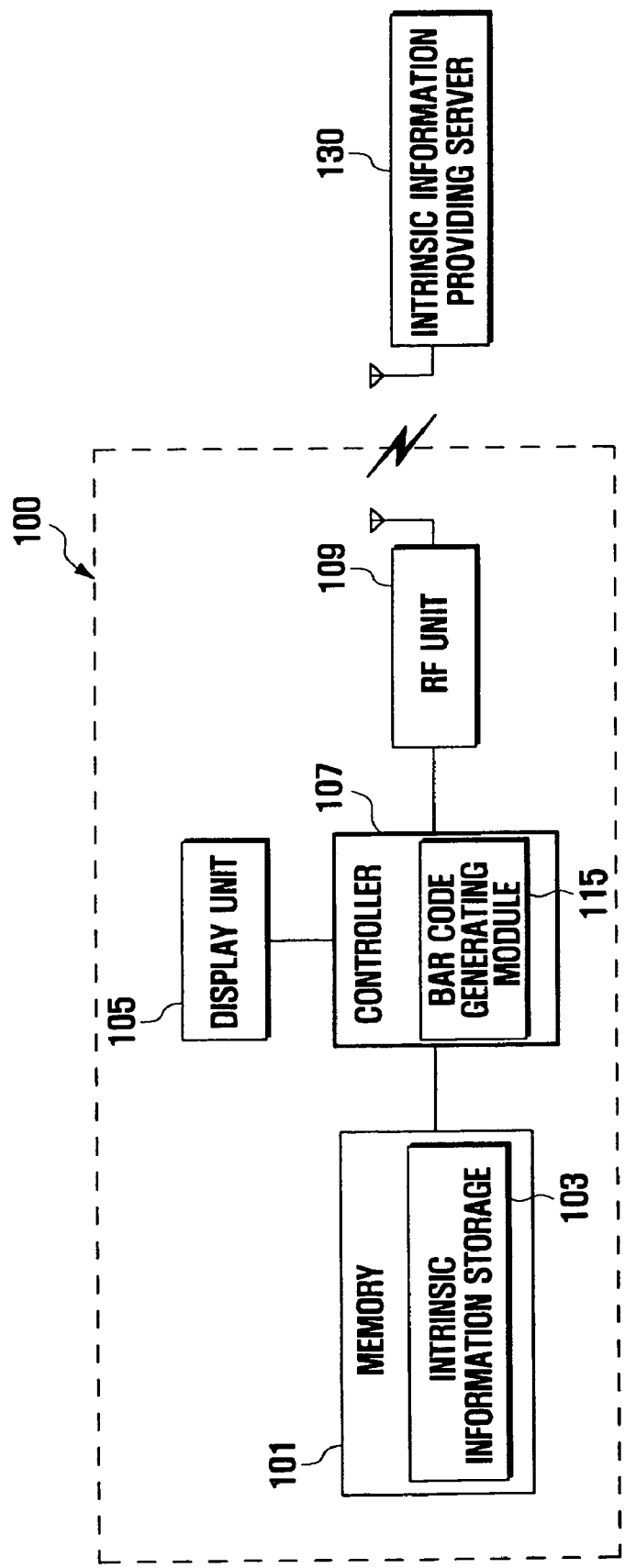
FIG. 1 is a block diagram illustrating a configuration of an apparatus for providing intrinsic information in a mobile communication terminal according to a first exemplary embodiment of the present invention.

FIG. 1 is a block diagram illustrating a configuration of an apparatus for providing intrinsic information in a mobile communication terminal according to a first exemplary embodiment of the present invention.

Referring to FIG. 1, the apparatus includes a mobile communication terminal 100 and an intrinsic information providing server 130.

The mobile communication terminal 100 includes a memory 101, a display unit 105, a controller 107, and an RF unit 109.

The memory 101 stores programs and information required to perform general operations of the mobile communication terminal 100. The memory 101 may include an intrinsic information storage 103 for storing information about the mobile communication terminal 100.

The display unit 105 displays information output by the controller 107. The display unit 105 may display intrinsic information that has been stored or is received in the mobile communication terminal 100 with a bar code. A bar code displayed in the display unit 105 may be recognized by a device such as a bar code reader.

The controller 107 controls general operations of the mobile communication terminal 100. The controller 107 may include a data processor with a transmitter for encoding and modulating a signal for transmission and a receiver for decoding and demodulating a received signal. The data processor may include a modem and a codec. The controller 107 may perform a function of a receiver for receiving intrinsic information of the mobile communication terminal 100 and a verification unit for verifying whether the intrinsic information is stored. The controller 107 may include a bar code generating module 115. The bar code generating module 115 generates intrinsic information, received from the intrinsic information providing server 130, with a bar code, and the generated bar code is recognized by a bar code reader.

The RF unit 109 performs a series of communication functions such as mobile phone communication, an SMS service or a multimedia messaging service, and data communication. The RF unit 109 transmits by converting voice and sound data and control data to a radio signal, and receives a radio signal to output by converting the radio signal to voice and sound data and control data. Therefore, the RF unit 109 includes an RF transmitter for up-converting and amplifying a signal for transmission and an RF receiver for low-noise amplifying and down-converting a received signal.

The intrinsic information providing server 130 may provide intrinsic information to the mobile communication terminal 100. When the intrinsic information providing server 130 receives an intrinsic information request signal from the mobile communication terminal 100, the intrinsic information providing server 130 transmits intrinsic information corresponding to the signal.

Figure 2:
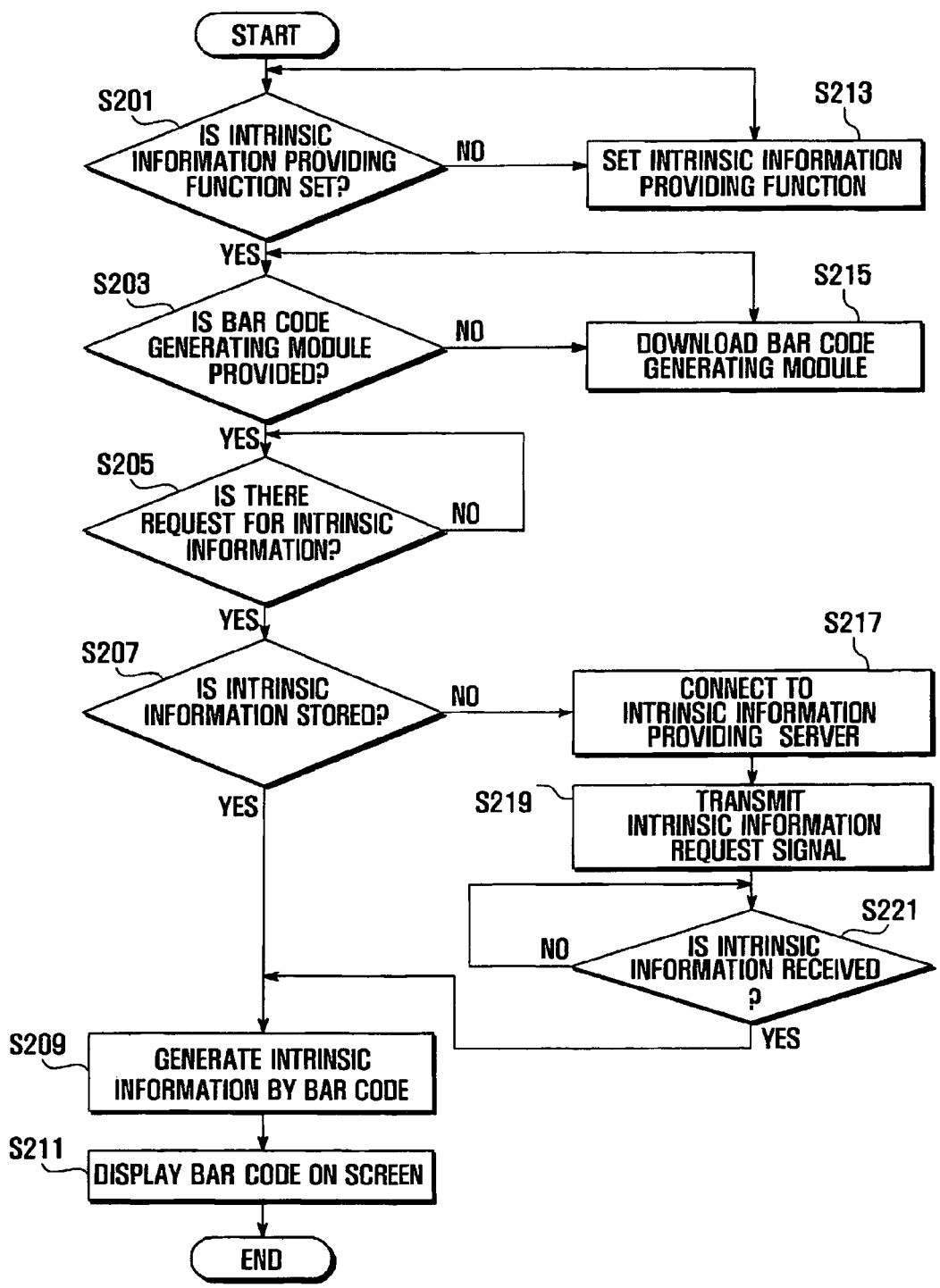
FIG. 2 is a flowchart illustrating a method of providing intrinsic information in a mobile communication terminal according to the first exemplary embodiment of the present invention.
Figure 3A:
FIGS. 3A to 3C are views illustrating examples of display screens that present intrinsic information provided in a mobile communication terminal according to an exemplary embodiment of the present invention.
Figure 3B:
Figure 3C:
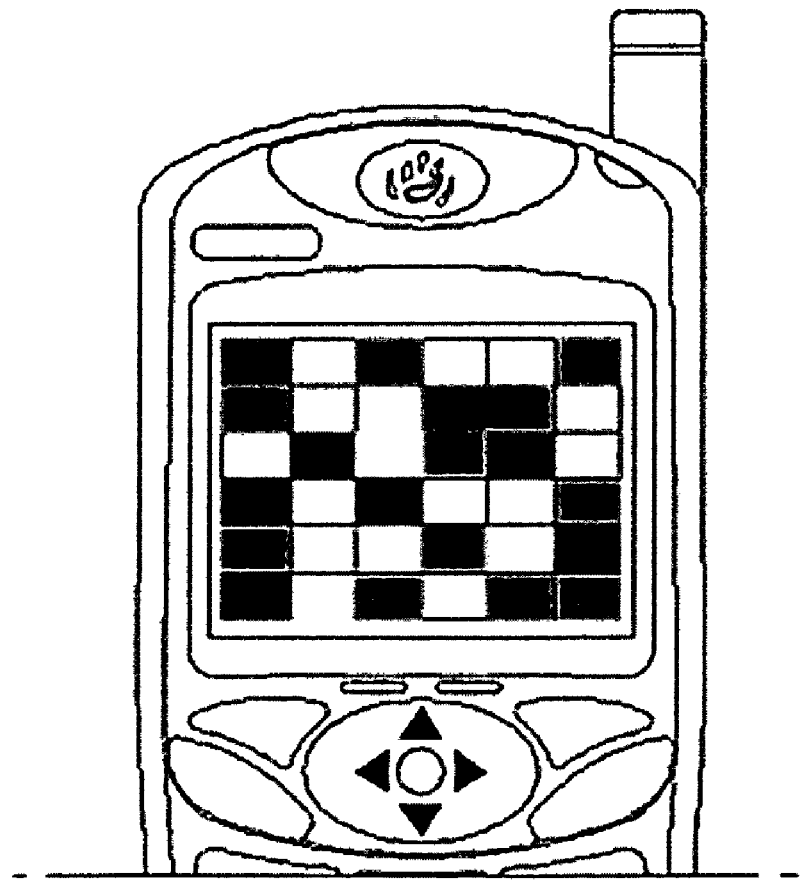

FIG. 2 is a flowchart illustrating a method of providing intrinsic information in a mobile communication terminal according to the first exemplary embodiment of the present invention. FIGS. 3A to 3C are views illustrating examples of display screens presenting intrinsic information provided in a mobile communication terminal according to an exemplary embodiment of the present invention.

Referring to FIGS. 1 and 2, in the method of providing intrinsic information in the mobile communication terminal 100 according to the first exemplary embodiment of the present invention, the controller 107 verifies whether an intrinsic information providing function is set in the mobile communication terminal (S201). If an intrinsic information providing function is not set, the controller 107 sets the function (S213).

Next, the controller 107 verifies whether there is a bar code generating module 115 (S203). According to an exemplary implementation, the bar code generating module 115 generates intrinsic information with a bar code, and the generated bar code is recognized by a bar code reader. If a bar code generating module 115 does not exist, the bar code generating module 115 is downloaded by the controller 115 (S215).

The controller 107 verifies whether there is a request for intrinsic information from a user (S205). A user can request intrinsic information to verify information about the mobile communication terminal 100.

If intrinsic information is requested, the controller 107 verifies whether the intrinsic information is stored in the intrinsic information storage 103 of the memory 101 (S207). The intrinsic information is generally stored in the memory 101.

If the intrinsic information is stored, the controller 107 generates the information with a bar code using the bar code generating module 115 (S209). A one-dimensional bar code, a two-dimensional bar code, or a three-dimensional bar code may be used as the bar code.

A bar code is a machine-readable language encoded to facilitate the easy reading of a character, number, and special symbol, among others with a specific arrangement pattern of black bars having various widths and white spaces. The bar code is widely used for expression, collection, and reading of various information. The bar code is classified as a one-dimensional bar code, a two-dimensional bar code, or a three-dimensional bar code.

A one-dimensional bar code is a linear code consisting of a series of vertical bars arranged in a horizontal direction for expressing a number or a simple character with combination and arrangement of bars and spaces. Because information is contained in only a horizontal direction (X direction) of the linear code, storage capacity of information is limited.

A two-dimensional bar code is a Braille type code or a mosaic code in which information is arranged in a plane by arranging the information in both directions (X direction and Y direction). The Braille type code has been developed to compensate for the limitation of information expression, which is a disadvantage of the existing one-dimensional bar code. The two-dimensional bar code allows at least one hundred times more information than the one-dimensional bar code to be expressed with two-dimensional symbols within a small quadrangular space. The two-dimensional bar code may contain various types of information such as a text of a character and a number, a graphic, a picture, a voice, a fingerprint, and a signature.

A three-dimensional bar code is a special code called a color code and an iconact. The color code uses a high-technology computer recognition method, and can contain about ten times more information than the existing two-dimensional bar code. The color code may also store various information using 16 billion possible combinations that can be generated by combining four colors of red, green, black, and blue within a quadrangular space having a width and a length of 3 mm. The iconact is a code in which 19 circles are arranged in a hexagonal shape and is a pattern recognition code that can store information with a size difference of each circle. The color code and the iconact can store various information about goods and various data such as Internet addresses, words, and numerals and thus allow a user to connect to a website and to watch moving images.

The controller 107 displays the generated bar code in the display unit 105 (S211). The bar code displayed in the display unit 105 is displayed with a one-dimensional bar code as illustrated in FIG. 3A, a two-dimensional bar code as shown in FIG. 3B, or a three-dimensional bar code as shown in FIG. 3C.

In the step S207, if intrinsic information is not stored, the controller 107 connects to the intrinsic information providing server 130 (S217).

The controller 107 transmits an intrinsic information request signal to the intrinsic information providing server 130 (S219) and verifies whether the intrinsic information is received according to the request (S221).

When the intrinsic information is received, the controller 107 proceeds to the step S209.

In the method and apparatus for providing intrinsic information in a mobile communication terminal according to the first exemplary embodiment of the present invention, when information about the mobile communication terminal is provided, information about the terminal is displayed on a screen with a bar code, so that it is easy to verify and recognize the information.

Figure 4:
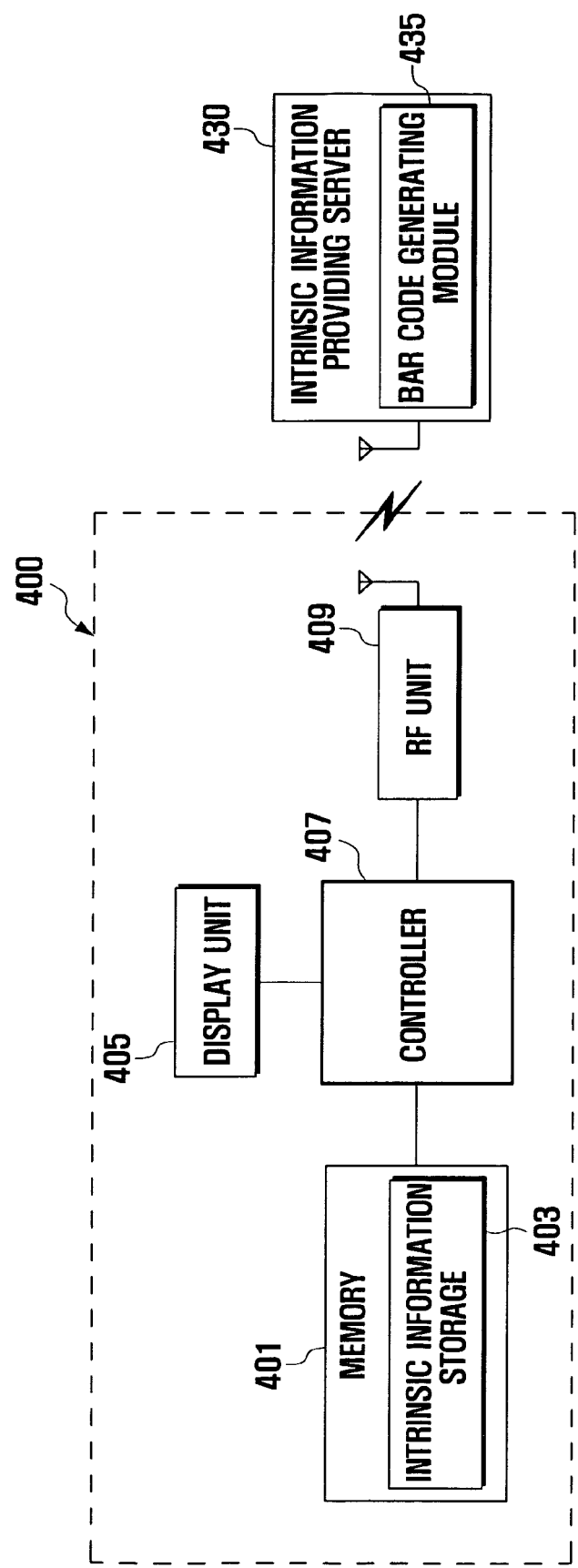
FIG. 4 is a block diagram illustrating a configuration of an apparatus for providing intrinsic information in a mobile communication terminal according to a second exemplary embodiment of the present invention.

FIG. 4 is a block diagram illustrating a configuration of an apparatus for providing intrinsic information in a mobile communication terminal according to a second exemplary embodiment of the present invention.

A method of providing intrinsic information in a mobile communication terminal according to the second exemplary embodiment of the present invention is similar to that of the first exemplary embodiment of the present invention, but is characterized by generating intrinsic information with a bar code in a intrinsic information providing server and then transmitting the bar code to the terminal. This is different from the method of generating intrinsic information of the first exemplary embodiment of the present invention with a bar code in the terminal.

Referring to FIG. 4, the apparatus for providing intrinsic information in the mobile communication terminal 400 according to the second exemplary embodiment of the present invention includes a mobile communication terminal 400 and an intrinsic information providing server 430.

The mobile communication terminal 400 includes a memory 401, a display unit 405, a controller 407, and an RF unit 409.

The intrinsic information providing server 430 may include a bar code generating module 435. The bar code generating module 435 generates intrinsic information of the mobile communication terminal 400 with a bar code. If the intrinsic information providing server 430 receives an intrinsic information request signal from the mobile communication terminal 400, the intrinsic information providing server 430 generates and transmits the intrinsic information corresponding to the signal with a bar code.

Figure 5:
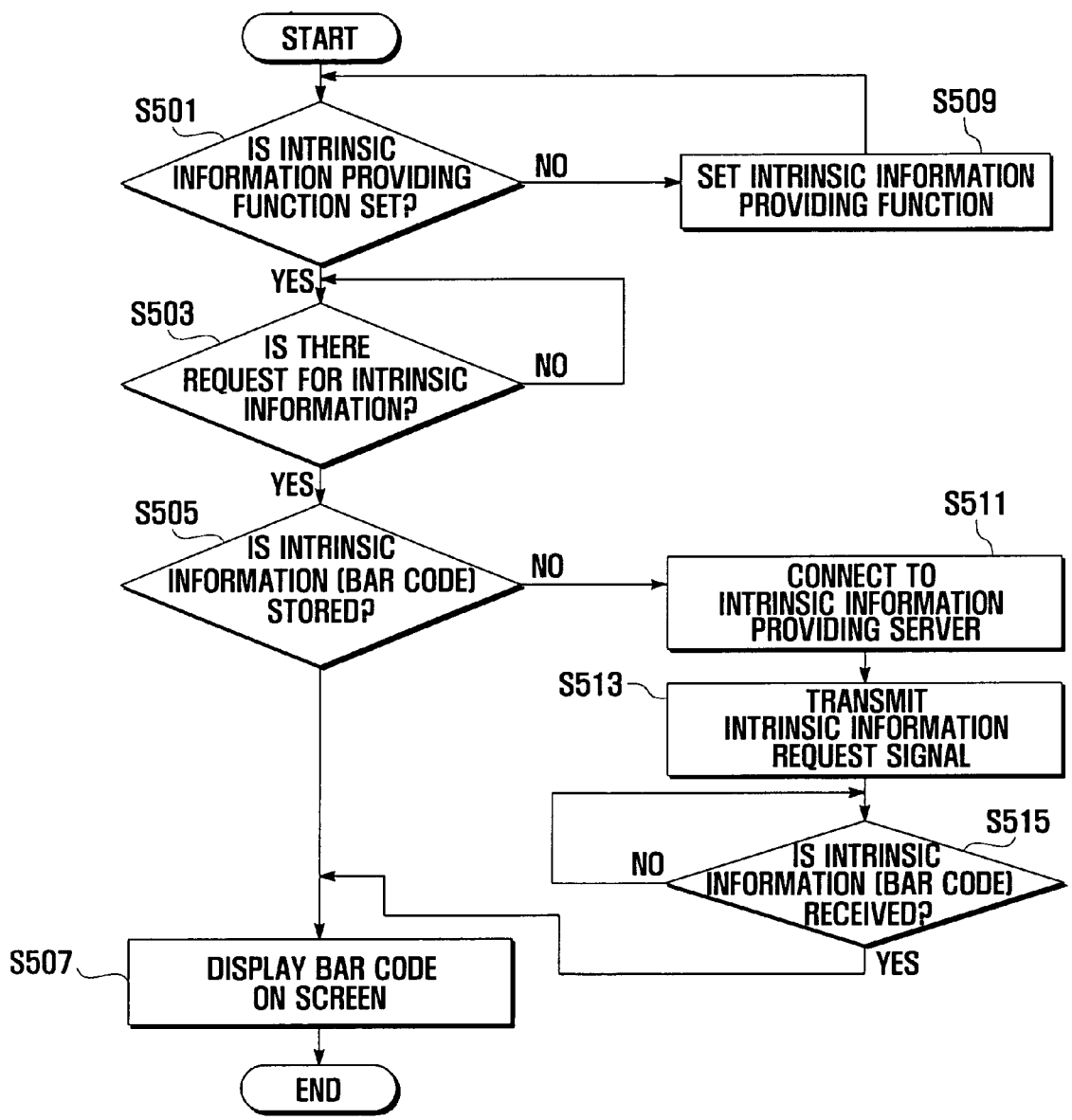
FIG. 5 is a flowchart illustrating a method of providing intrinsic information in a mobile communication terminal according to the second exemplary embodiment of the present invention.

FIG. 5 is a flowchart illustrating a method of providing intrinsic information in a mobile communication terminal according to the second exemplary embodiment of the present invention.

Referring to FIGS. 4 and 5, in the method of providing intrinsic information in the mobile communication terminal 400 according to the second exemplary embodiment of the present invention, the controller 407 first verifies whether an intrinsic information providing function is set in the mobile communication terminal 400 (S501). If an intrinsic information providing function is not set in the mobile communication terminal 400, the controller 407 sets the function (S509).

Next, the controller 407 verifies whether there is a request for intrinsic information from a user (S503). A user can request intrinsic information in order to verify information about the mobile communication terminal 400.

If intrinsic information is requested, the controller 407 verifies whether the intrinsic information converted to a bar code is stored in the intrinsic information storage 403 of the memory 401 (S505).

If the intrinsic information converted to a bar code is stored, the controller 407 displays the bar code in the display unit 405 (S507).

In the step S505, if the intrinsic information is not stored, the controller 407 connects to the intrinsic information providing server 430 (S511) and transmits an intrinsic information request signal (S513).

The controller 407 verifies whether the intrinsic information is received according to the request (S515). When the intrinsic information is received, the controller 407 proceeds to the step S507.

Figure 6:
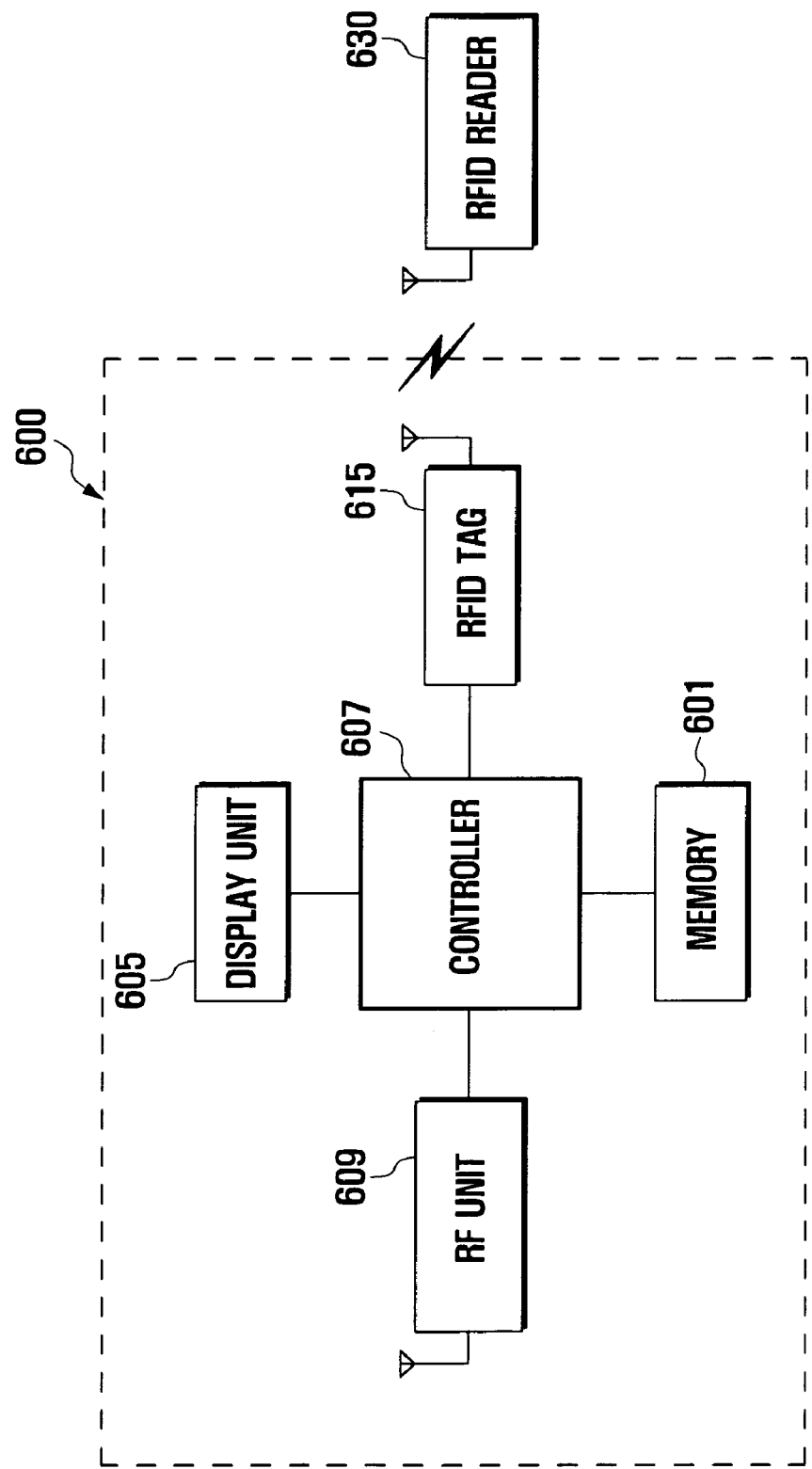
FIG. 6 is a block diagram illustrating a configuration of an apparatus for providing intrinsic information in a mobile communication terminal according to a third exemplary embodiment of the present invention.

FIG. 6 is a block diagram illustrating a configuration of an apparatus for providing intrinsic information in a mobile communication terminal according to a third exemplary embodiment of the present invention.

A method of providing intrinsic information according to the third exemplary embodiment of the present invention is similar to those of the first and second exemplary embodiments, but is characterized by storing intrinsic information of the terminal in an RFID tag and verifying the intrinsic information with an RFID reader.

Referring to FIG. 6, the apparatus for providing intrinsic information in a mobile communication terminal according to the third exemplary embodiment includes a mobile communication terminal 600 and an RFID reader 630.

The mobile communication terminal 600 includes a memory 601, a display unit 605, a controller 607, an RF unit 609, and an RFID tag 615.

The RFID tag 615 includes a micro integrated circuit chip (IC chip) and an antenna and is a tag that can provide information about goods without direct contact. The IC chip of the RFID tag 615 permanently stores information about the mobile communication terminal 600 to which the tag is attached.

The RFID tag 615 can be a passive type or an active type, and is generally a mutual induction passive tag. In the passive tag, a separate power source is not required since energy required for operating the chip is supplied by a reader. The active tag generates and transmits a strong response signal even in an area in which a transmitting frequency of a reader is weak by using an additional energy source such as an external power source. This is advantageous because an active RFID tag can be sensed in a wider area than a passive tag.

The RFID reader 630 sends an information providing instruction to the RFID tag 615, and receives and reads the provided information. The RFID tag 615 is a transponder that automatically sends a response when the RFID tag 615 receives a signal from the RFID reader 630. Since the RFID reader 630 can read several RFID tags 615 simultaneously, the RFID reader 630 can store intrinsic information of the mobile communication terminal 600 in a bundle with only one read operation.

The RFID reader 630 sends a read instruction to the RFID tag 615 to acquire information stored in the RFID tag 615 and receives a signal from the RFID tag 615. In general, the RFID reader 630 includes an RF module, a control unit, and a coupling element and is connected to an information processing system.

Figure 7:
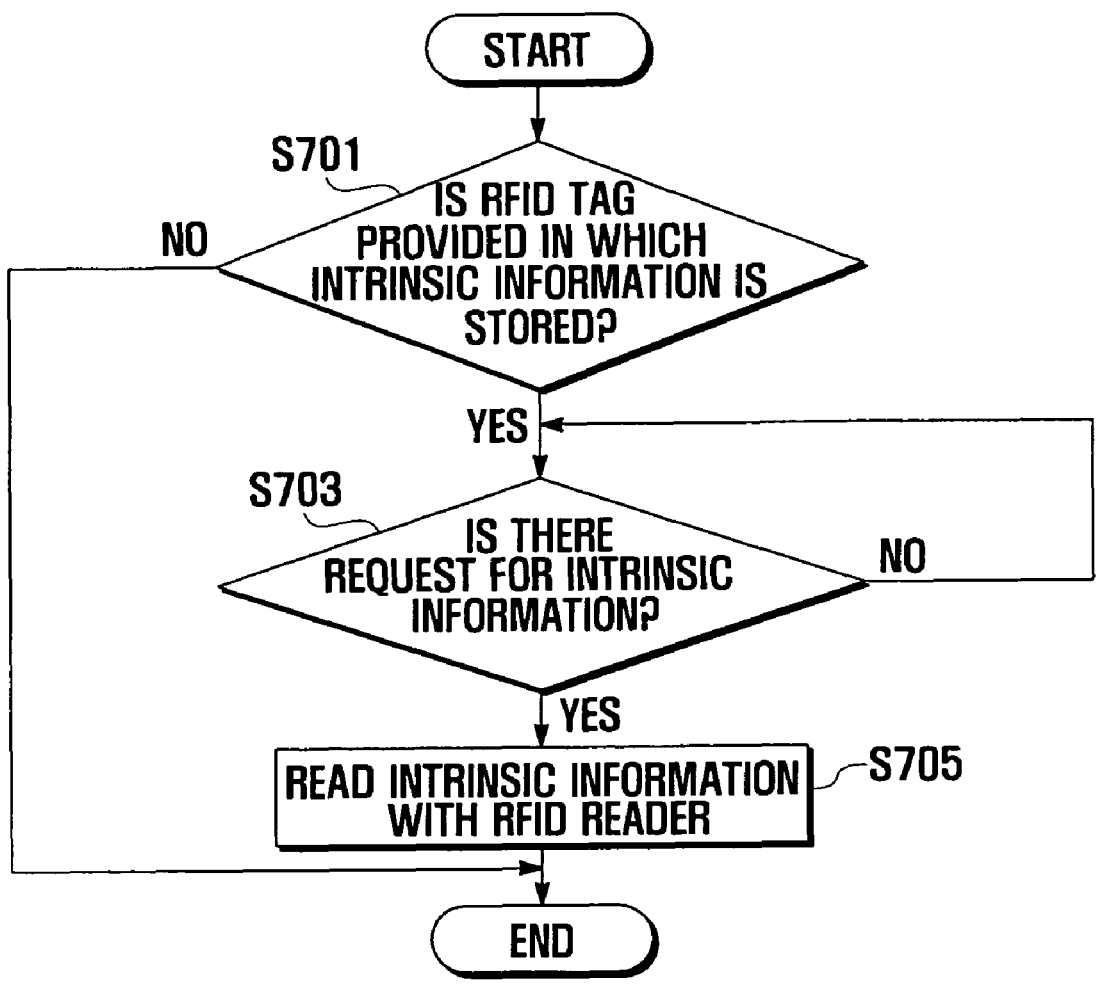
FIG. 7 is a flowchart illustrating a method of providing intrinsic information in a mobile communication terminal according to the third exemplary embodiment of the present invention.

FIG. 7 is a flowchart illustrating a method of providing intrinsic information in a mobile communication terminal according to the third exemplary embodiment of the present invention.

Referring to FIGS. 6 and 7, in the method of providing intrinsic information in the mobile communication terminal 600 according to the third exemplary embodiment, the controller 607 first verifies whether the RFID tag 615 is provided in which intrinsic information is stored (S701). If the RFID tag 615 is not provided, the process ends.

If the RFID tag 615 is provided in the step S701, the controller 607 verifies whether a request for intrinsic information is received from a user (S703). A user can request intrinsic information in order to verify information about the mobile communication terminal 600.

If the intrinsic information is requested, the RFID reader 630 reads the intrinsic information (S705).

In the method and apparatus for providing intrinsic information in a mobile communication terminal according to the third exemplary embodiment, when information about the mobile communication terminal is requested from the outside, even if the mobile communication terminal is turned off, information about the terminal stored in the RFID tag is read by the RFID reader, so that it is easy to verify and recognize the information about the terminal.

The intrinsic information can be displayed in a display unit in other forms, for example, a character or a picture, instead of a bar code. This will be easily understood by those skilled in the art.

As described above, in the method and apparatus for providing intrinsic information in a mobile communication terminal according to the present invention, when a user wants to verify information about the mobile communication terminal, the information about the terminal is displayed on a screen with a bar code, a character, or a picture, so that it is easy to verify and recognize the information about the terminal.

Further, when information about the mobile communication terminal is requested from the outside, the information about the terminal stored in the RFID tag is read by the RFID reader even if the mobile communication terminal is turned off so that it is easy to verify and recognize the information about the terminal.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing intrinsic information in a mobile communication terminal comprising:
   determining whether intrinsic information about the mobile communication terminal is stored in the mobile communication terminal; and
   displaying, if it is determined that intrinsic information is stored, the intrinsic information on a screen, wherein if it is determined that intrinsic information is not stored, the method further comprises:
   connecting to an intrinsic information providing server;
   transmitting an intrinsic information request signal to the intrinsic information providing server; and
   receiving and storing the intrinsic information provided by the intrinsic information providing server in the mobile communication terminal.

2. The method of claim 1, wherein the intrinsic information is stored in a memory of the mobile communication terminal.

3. The method of claim 2, wherein the intrinsic information comprises at least one of a production date, model name, serial number, Bluetooth authentication number, and electronic serial number (ESN) of the mobile communication terminal.

4. The method of claim 1, wherein the determining further comprises:
verifying whether a bar code generating module for generating the intrinsic information with a bar code is provided; and
downloading, if a bar code generating module is not provided, the bar code generating module.

5. The method of claim 1, wherein the determining further comprises generating the intrinsic information with a bar code.

6. The method of claim 1, wherein the intrinsic information is stored with a bar code.

7. The method of claim 1, wherein the displaying displays the intrinsic information on a screen with one of a one-dimensional bar code, a two-dimensional bar code, and a three-dimensional bar code.

8. The method of claim 1, wherein the mobile communication terminal comprises a display unit and a key input unit in a front surface and a rear surface.

9. A method of providing intrinsic information in a mobile communication terminal, the method comprising the steps of:
determining whether intrinsic information is stored in the mobile communication terminal;
requesting, if intrinsic information is not stored, the intrinsic information from an intrinsic information providing server; and
displaying, if intrinsic information is stored, the intrinsic information on a screen, wherein the requesting step further comprises:
connecting to the intrinsic information providing server;
transmitting an intrinsic information request signal to the intrinsic information providing server; and
receiving and storing the intrinsic information.

10. The method of claim 9, wherein the mobile communication terminal comprises a display unit and a key input unit in both a front surface and a rear surface.

11. An apparatus for providing intrinsic information in a mobile communication terminal comprising:

a communication unit for transmitting a request for intrinsic information from an intrinsic information providing server if it is determined that intrinsic information is not stored at the mobile communication terminal;
a receiver for receiving intrinsic information of the mobile communication terminal from the intrinsic information providing server;
a verification unit for verifying the received intrinsic information; and
a display unit for displaying the verified intrinsic information on a screen.

12. The apparatus of claim 11, wherein the received intrinsic information is stored in a memory of the mobile communication terminal.

13. The apparatus of claim 11, wherein the verification unit comprises a bar code conversion module for converting the intrinsic information to a bar code.

14. The apparatus of claim 11, wherein the intrinsic information is received in a bar code form.

15. The apparatus of claim 11, wherein the mobile communication terminal comprises a display unit and a key input unit in a front surface and a rear surface.

16. The apparatus of claim 11, wherein the mobile communication terminal comprises an RFID tag for storing the intrinsic information, which can be read in at least one of a turn-off and turn-on state of the mobile communication terminal.

17. A method of providing intrinsic information in a mobile communication terminal comprising the steps of:
determining whether intrinsic information about the mobile communication terminal is stored in a memory of the mobile communication terminal, wherein if intrinsic information is not stored, the determining step further comprises:
connecting to an intrinsic information providing server,
transmitting an intrinsic information request signal to the intrinsic information providing server, and
receiving intrinsic information from the intrinsic information providing server and storing the intrinsic information in a memory of the mobile communication terminal; and
displaying the stored intrinsic information on a screen.

* * * * *